(No Model.)
E. McCULLOUGH.
SPIRIT LEVEL FOR MEASURING TAPES.
No. 479,521. Patented July 26, 1892.
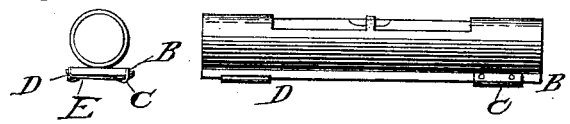
Witnesses.
James Walter Phillips
Howard William Fording
Inventor.
Ernest McCullough

UNITED STATES PATENT OFFICE.

ERNEST McCULLOUGH, OF SAN FRANCISCO, CALIFORNIA.

SPIRIT-LEVEL FOR MEASURING-TAPES.

SPECIFICATION forming part of Letters Patent No. 479,521, dated July 26, 1892.

Application filed April 6, 1891. Serial No. 387,867. (No model.)

*To all whom it may concern:*

Be it known that I, ERNEST McCULLOUGH, a citizen of the United States, residing at San Francisco, in the county of San Francisco and State of California, have invented a new and useful Leveling Device for Measuring-Tapes, of which the following is a specification, reference being had to the accompanying drawings.

My invention relates to the combination of a spirit-level with spring or hinged clamps to be used on tapes, rods, or other devices for measuring to show when same are in a horizontal position.

The object of my invention is to provide means of showing when rods, tapes, or other devices for measuring are in a horizontal position by attaching to same a spirit-level by hinged or spring clamps, said clamps being provided with stops to prevent the level from slipping off the article to which it is attached by the clamps, the clamps being attached alternately on opposite sides of the level to equalize the weight caused by their projecting parts, and thus prevent any twisting strain in any tape to which the level might be attached, which would be caused if the level were heavier on one side than the other. The spirit-level is inclosed in a metallic tube fastened to a metallic base with a true flat surface, which surface is level when the bubble of the spirit-level is in the middle of the tube. The clamps are attached to the sides of said base.

In the accompanying drawings, Figures 1 and 2 show, respectively, end and side views of level provided with clamps attached one to one side and one to the opposite side of the base.

The clamp is attached to the level-base at B, and is bent at C, causing it to press against the base at E. The tape, rod, or article to be leveled is placed between the clamps and base. The clamp, to serve also as a stop, is bent upward enough at D to hold the level in its place and yet allow of its easy attachment and removal by party using it.

The clamp may be so shaped as to admit of thick or thin or round or angular articles being placed between it and the level-base and the construction so varied as to admit of a hinge at c in place of a spring, and a hinged or spring catch at D to serve as a stop, all of which are fully covered in my claims.

What I do claim as my invention, and desire to secure by Letters Patent, is—

1. The spirit-level, with the clamps E attached to the opposite sides of the base, substantially as described, and for the purposes specified.

2. A spirit-level with a spring-clamp at each end and attached on opposite sides of the base for application to tapes and other measuring devices, substantially as described, and for the purposes specified.

ERNEST McCULLOUGH.

Witnesses:
 HOWARD W. FORDING,
 JAMES W. PHILLIPS.